(12) United States Patent
Nakao et al.

(10) Patent No.: US 6,721,344 B2
(45) Date of Patent: Apr. 13, 2004

(54) INJECTION LOCKING TYPE OR MOPA TYPE OF LASER DEVICE

(75) Inventors: Kiyoharu Nakao, Isehara (JP); Osamu Wakabayashi, Hiratsuka (JP)

(73) Assignees: Komatsu Ltd. (JP); Gigaphoton Inc. (JP)

( * ) Notice: Subject to any disclaimer, the term of this patent is extended or adjusted under 35 U.S.C. 154(b) by 0 days.

(21) Appl. No.: 10/152,822

(22) Filed: May 23, 2002

(65) Prior Publication Data

US 2002/0196823 A1 Dec. 26, 2002

(30) Foreign Application Priority Data

Jun. 26, 2001 (JP) ........................................ 2001-192886

(51) Int. Cl.[7] ................................................. H01S 3/22
(52) U.S. Cl. ........................................... 372/55; 372/32
(58) Field of Search ................................ 372/29.01, 55, 372/57, 32

(56) References Cited

U.S. PATENT DOCUMENTS

| | | | | |
|---|---|---|---|---|
| 5,142,543 A | * | 8/1992 | Wakabayashi et al. | ........ 372/32 |
| 5,237,331 A | * | 8/1993 | Henderson et al. | ........... 342/54 |
| 5,715,269 A | * | 2/1998 | Shinji | ........................... 372/55 |
| 5,856,991 A | * | 1/1999 | Ershov | ........................ 372/57 |
| 6,005,880 A | * | 12/1999 | Basting et al. | ........... 372/38.04 |
| 6,327,286 B1 | * | 12/2001 | Ness et al. | ............... 372/38.02 |
| 6,370,174 B1 | * | 4/2002 | Onkels et al. | ........... 372/38.04 |
| 6,381,257 B1 | * | 4/2002 | Ershov et al. | ................. 372/57 |
| 2002/0154668 A1 | * | 10/2002 | Knowles et al. | .............. 372/55 |
| 2002/0154671 A1 | * | 10/2002 | Knowles et al. | ............. 375/296 |

* cited by examiner

*Primary Examiner*—Paul Ip
*Assistant Examiner*—Tuan Nguyen
(74) *Attorney, Agent, or Firm*—Rader, Fishman & Grauer PLLC

(57) ABSTRACT

An injection locking type or MOPA type of laser device capable of always obtaining stable output energy and wavelength is provided. For this purpose, the laser device includes an oscillator (11A) for oscillating seed laser light (21A) with wavelength band-narrowed by a band-narrowing unit (30), an amplifier (11B) for amplifying the seed laser light and emitting the amplified laser light (21B), a wavelength monitor (34A) for detecting at least a wavelength characteristic of the seed laser light, and a laser controller (29) for performing adjustment oscillation to contain a wavelength characteristic within a predetermined allowable range, at a time of startup or when laser oscillation is suspended for a predetermined period of time or more.

8 Claims, 7 Drawing Sheets

# INJECTION LOCKING TYPE OR MOPA TYPE OF LASER DEVICE

TECHNICAL FIELD

The present invention relates to an injection locking type or MOPA (Main Oscillator Power Amplifier) type of laser device.

BACKGROUND ART

An injection locking type of laser device in which seed laser light oscillated from an oscillator is amplified in an amplifier is conventionally known and disclosed in, for example, Japanese Patent Laid-open No. 2000-357838. FIG. 8 shows a block diagram of an injection locking type of laser device according to a prior art, and the prior art will be explained based on FIG. 8 hereinafter. In FIG. 8, an injection locking type of laser device 11 includes an oscillator 11A for oscillating seed laser light 21A with narrow-banded wavelength, and an amplifier 11B for amplifying the seed laser light 21A and emitting amplified laser light 21B.

The oscillator 11A causes discharge between oscillator electrodes 14A and 15A inside an oscillator chamber 12A in which a laser gas including fluorine and neon or helium as a buffer gas, and excites the laser gas to generate the seed laser light 21A. The seed laser light 21A thus occurring is incident on a band narrowing unit 30 placed at a rear of the oscillator chamber 12A (the left side of the paper surface in FIG. 8), and is expanded by prisms 32 and 32, and only predetermined wavelength is reflected at a grating 33. This is called band-narrowing.

The seed laser light 21A emitted from the oscillator 11A passes through a rear window 19B from an injection hole 45 of a concave mirror 36 with a hole of the amplifier 11B, and is incident on the amplifier chamber 12B containing a laser gas. Amplification discharge is caused between amplifier electrodes 14B and 15B synchronously with the seed laser light 21A in the amplifier chamber 12B. Thus, pulse output of the seed laser light 21A is amplified with center wavelength $\lambda c$ and spectral line width $\Delta\lambda$ that is the same meaning as a spectral band width $\Delta\lambda$ (they are called wavelength characteristics) being kept, and the seed laser light 21A passes through a window 17B and is emitted from around a convex mirror 37 as the amplified laser light 21B. The amplified laser light 21B is incident on an aligner 25 to be a light source for exposure. In the above Laid-open Patent, the explanation is made with an ArF excimer laser device, but the same explanation is also applied to KrF excimer laser devices and fluorine laser devices.

However, the following disadvantages exist in using the injection locking type of laser device 11 according to the aforementioned prior art as the light source for exposure of the aligner 25 such as a stepper. Specifically, during exposure, it is sometimes necessary to suspend discharge for a specified period of time to stop the laser oscillation in order to replace wafers or reticles. When the laser oscillation is stopped, optical components such as a prism 32 and the like are not irradiated with laser light, so that temperature of the optical components and gas around the optical component decreases.

As a result, at the time of resuming oscillation after the suspension, there arises the disadvantage that the amplified laser light 21B having the center wavelength $\lambda c$, which is deviated from a target value, is emitted and resolution of exposure is deteriorated. Further, there arises the disadvantage that it takes time to carry out a control to improve a change in the wavelength characteristics, and during that period of time, exposure cannot be carried out, which reduces availability of the aligner 25.

Especially when the injection locking type of fluorine molecular laser device is used as a source for exposure, the wavelength of the amplified laser light 21B is short, and thus the optical material that can be used in the aligner 25 is limited, which makes it difficult to remove chromatic aberration according to the optical component. Therefore, it is necessary to conform the center wavelength $\lambda c$ of the amplified laser light 21B to the target value more strictly as compared with the case of the excimer laser device. Consequently, in the case of a fluorine molecular laser device, it is difficult to conform the wavelength characteristic to a target value after oscillation is resumed, thus causing the disadvantage that more time is required as compared with the excimer laser device.

SUMMARY OF THE INVENTION

The present invention is made in view of the above-described disadvantages, and its object is to provide an injection locking type or MOPA type of laser device capable of promptly obtaining stable output energy and a wavelength characteristic.

In order to attain the above-described object, the injection locking type or MOPA type of laser device according to the present invention has a structure including an oscillator for exciting a laser gas by oscillator discharge and oscillating seed laser light with wavelength being band-narrowed by a band-narrowing unit, an amplifier for amplifying the seed laser light by amplification discharge and emitting the amplified laser light, a first wavelength monitor for detecting at least a wavelength characteristic of the seed laser light, and a laser controller for performing adjustment oscillation to contain the wavelength characteristic of the seed laser light within a predetermined allowable range, at a time of startup or when laser oscillation is suspended for a predetermined period of time or more.

According to the above structure, at the time of starting laser oscillation or when resuming the laser oscillation after suspending it, the wavelength characteristic of the seed laser light is within the predetermined allowable range, and therefore the wavelength characteristic of the amplified laser light is near a target value just after starting or resuming the oscillation, thus reducing time required for the wavelength control.

Further, in the laser device, the laser controller may drive the band-narrowing unit to contain the wavelength characteristic of the seed laser light within the predetermined allowable range on an occasion of the adjustment oscillation.

According to the above structure, the band-narrowing unit is actually driven, and therefore the wavelength characteristic of the seed laser light to be oscillated can be surely and promptly contain within the allowable range.

In the laser device, a second wavelength monitor for detecting at least a wavelength characteristic of the amplified laser light may be further included, and the laser controller may carry out a control so that the amplified laser light oscillates in synchronization with the seed laser light on an occasion of the adjustment oscillation.

According to the above structure, since the amplified laser light is synchronized with the seed laser light just before startup or during the suspension, the amplified laser light oscillates in synchronization with the seed laser light from a time just after startup or resuming oscillation, and thus the amplified laser light with an improper wavelength characteristic is not emitted.

Further, in the laser device, a delay circuit for setting a delay time from light emission of the seed laser light to a start of the amplification discharge may be further included, and the laser controller may output a command to the delay circuit to change the delay time and oscillate the amplified laser light in synchronization with the seed laser light.

According to the above structure, the delay time is adjusted, and therefore the amplified laser light can be surely synchronized with the seed laser light.

BEST MODE FOR CARRYING OUT THE INVENTION

A preferred embodiment according to the present invention will be explained in detail below with reference to the drawings.

Figure 1:
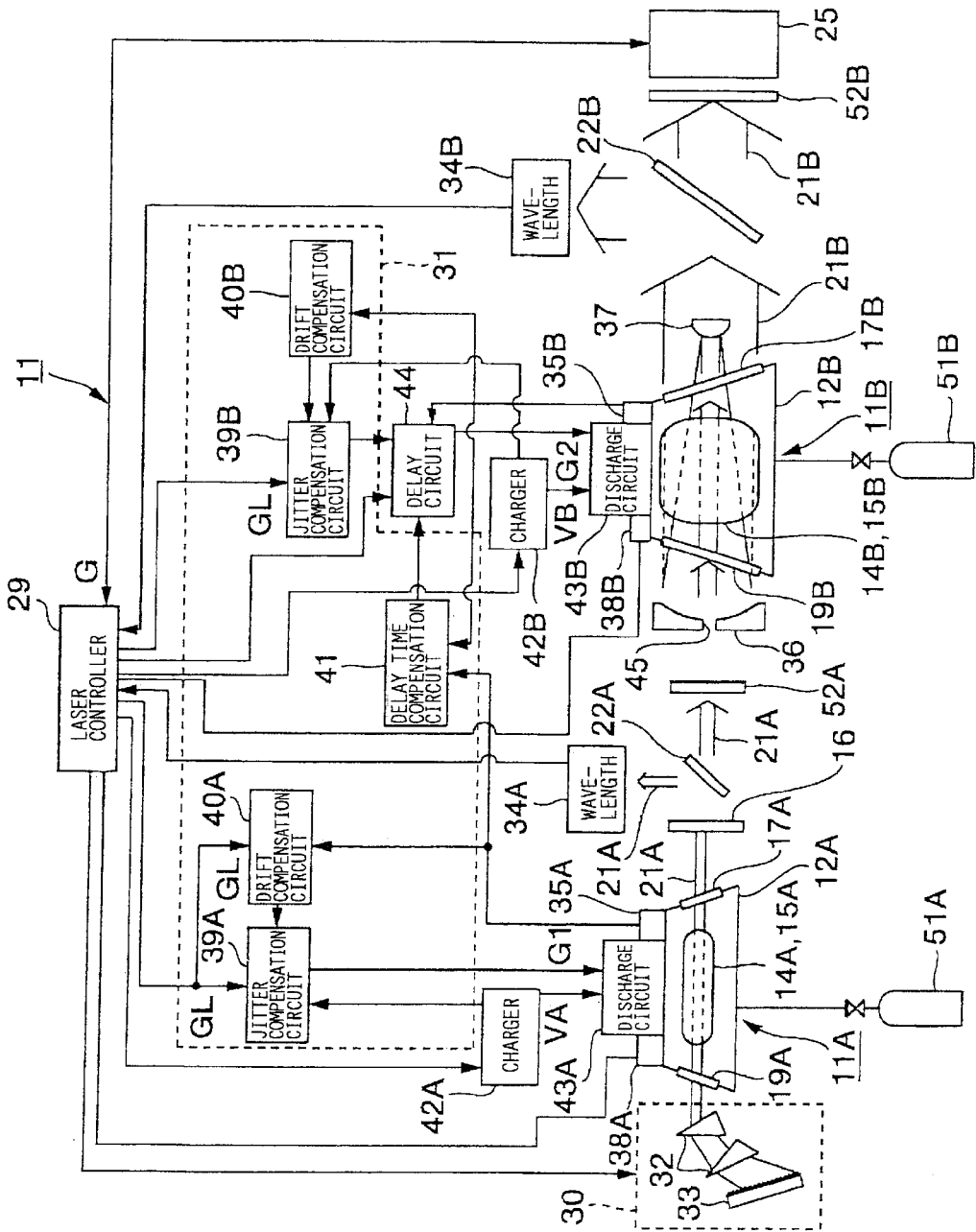
FIG. 1 is a schematic block diagram of a fluorine molecular laser device according to an embodiment of the present invention.

FIG. 1 shows a block diagram of an injection locking type of fluorine molecular laser device 11 (hereinafter, called the fluorine molecular laser device 11) according to the present embodiment. In FIG. 1, the fluorine molecular laser device 11 includes an oscillator 11A for oscillating seed laser light 21A with band-narrowed wavelength, and an amplifier 11B for amplifying the seed laser light 21A and emitting amplified laser light 21B. The amplified laser light 21B which is emitted from the fluorine molecular laser device 11 is incident on an aligner 25 such as a stepper to be light for exposure.

The fluorine molecular laser device 11 includes a laser controller 29 for controlling the entire device. The laser controller 29 is electrically connected to the aligner 25 and they are communicable with each other. The laser controller 29 receives a trigger signal G, which is a signal for indicating laser oscillation, from the aligner 25, and following this, it outputs a trigger signal GL to the oscillator 11A and the amplifier 11B.

In this situation, the trigger signal GL has timing compensated by a compensation circuit 31 that will be described later and is outputted to the oscillator 11A as an oscillator trigger signal G1. The trigger signal GL is outputted to the amplifier 11B as an amplifier trigger signal G2, with a predetermined time delay as compared with that to the oscillator 11A by the compensation circuit 31 and a delay circuit 44. It is possible that the laser controller 29 outputs the trigger signal GL independently of the trigger signal G from the aligner 25 and causes discharge in the oscillator 11A and the amplifier 11B.

The oscillator 11A includes an oscillator chamber 12A in which a laser gas including, for example, fluorine ($F_2$) and neon (Ne) as a buffer gas is sealed, and windows 17A and 19A provided at both end portions of the oscillator chamber 12A. As a laser gas, fluorine and neon or helium (He) as a buffer gas, or fluorine and helium as a buffer gas may be used.

A pair of oscillator electrodes 14A and 15A are disposed to oppose each other in a perpendicular direction to the paper surface in FIG. 1 at a predetermined position inside the oscillator chamber 12A. When the oscillator discharge circuit 43A receives the oscillator trigger signal G1, oscillator voltage VA applied from an oscillator charger 42A is pulse-compressed by the oscillator discharge circuit 43A, and is applied between the oscillator electrodes 14A and 15A in a pulse form. As a result, oscillator discharge occurs between the oscillator electrodes 14A and 15A to excite a laser gas, and the seed laser light 21A in a pulse form occurs.

The seed laser light 21A thus occurring is incident on a band-narrowing unit 30 placed at a rear of the oscillator chamber 12A (the left side of the paper surface in FIG. 1), expanded by prisms 32 and 32, and is incident on a grating 33. In the grating 33, only the seed laser light 21A having wavelength near predetermined center wavelength $\lambda c$ is reflected by diffraction. This is called band narrowing.

In the grating 33, an incident angle and diffraction angle of the seed laser light 21A is made variable by a drive mechanism (not shown) electrically connected to the laser controller 29. The laser controller 29 outputs a signal to the drive mechanism and by changing the above-described incident angle, it can control the center wavelength $\lambda c$ of the seed laser light 21A to desired wavelength.

The seed laser light 21A, which is band-narrowed inside the band narrowing unit 30, is emitted forward (rightward on the paper surface of FIG. 1) through a partial reflection mirror 16 as the seed laser light 21A having the center wavelength $\lambda c$. Part of the seed laser light 21A is taken out by a beam splitter 22A and is incident on a wavelength monitor 34A (the first wavelength monitor 34A). The wavelength monitor 34A includes a power monitor for measuring pulse output of the seed laser light 21A and a spectroscope for measuring the center wavelength $\lambda c$ and the spectral bandwidth $\Delta\lambda$. It outputs these monitored data (hereinafter, they are called laser parameters) to the laser controller 29.

Based on the monitored center wavelength $\lambda c$, the laser controller 29 outputs a command signal to the aforementioned drive mechanism to rotate the grating 33, and thereby controls the center wavelength $\lambda c$ of the seed laser light 21A to be a desired target value. This is called a wavelength control. The laser controller 29 also outputs a command signal to the oscillator charger 42A based on the monitored pulse output to change the oscillator voltage VA, and thereby controls the pulse output of the seed laser light 21A to be a desired output value. This is called a power lock control. The laser controller 29 also carries out a power lock control for the amplifier 11B in the same manner so that pulse output of the amplified laser light 21B becomes a desired output value.

The amplifier 11B includes an amplifier chamber 12B in which a front window 17B and a rear window 19B are fixed at a front and rear portion thereof and a laser gas is sealed.

In the amplifier chamber 12B, a pair of amplifier electrodes 14B and 15B are placed to oppose each other in the perpendicular direction to the paper surface of FIG. 1. A concave mirror 36 with a hole having an injection hole 45 is provided behind the rear window 19B, and a convex mirror 37 is provided in front of the front window 17B to oppose the injection hole 45, whereby an unstable resonator is constituted. In FIG. 1, the seed laser light 21A oscillated from the oscillator 11A passes through the rear window 19 from the injection hole 45 of the concave mirror 36 with a hole, and is incident on the amplifier 11B.

An amplifier charger 42B applies amplifier voltage VB to an amplification discharge circuit 43B. The amplifier voltage VB is pulse-compressed in the amplification discharge circuit 43B based on the trigger signal G2 which has the timing compensated by the compensation circuit 31 and the delay circuit 44, and is applied between the amplifier electrodes 14B and 15B in a pulse form. As a result, amplification discharge occurs synchronously with the seed laser light 21A, and the seed laser light 21A is amplified while being reflected to and from the concave mirror 36 with a hole and the convex mirror 37.

As a result, the seed laser light 21A has pulse output amplified while keeping the wavelength characteristics, and is emitted from around the convex mirror 37 as the amplified laser light 21B. Part of the amplified laser light 21B is taken out at a beam splitter 22B, and is incident on a wavelength monitor 34B (the second wavelength monitor 34B). The wavelength monitor 34B monitors output energy, center wavelength λc and spectral line width Δλ of the amplified laser light 21B and outputs them to the laser controller 29.

Shutters 52A and 52B openable and closable based on the instructions of the laser controller 29 are placed between the oscillator 11A and the amplifier 11B, and in front of the amplifier 11B, respectively. Thereby, it is possible to shield the seed laser light 21A and the amplified laser light 21B. Laser gas cylinders 51A and 51B in which laser gases are sealed at predetermined composition ratios are connected to the oscillator chamber 12A and the amplifier chamber 12B. Further, pressure detectors 38A and 38B for detecting the inside pressures and outputting the data to the laser controller 29 are connected to the oscillator chamber 12A and the amplifier chamber 12B respectively.

Figure 2:
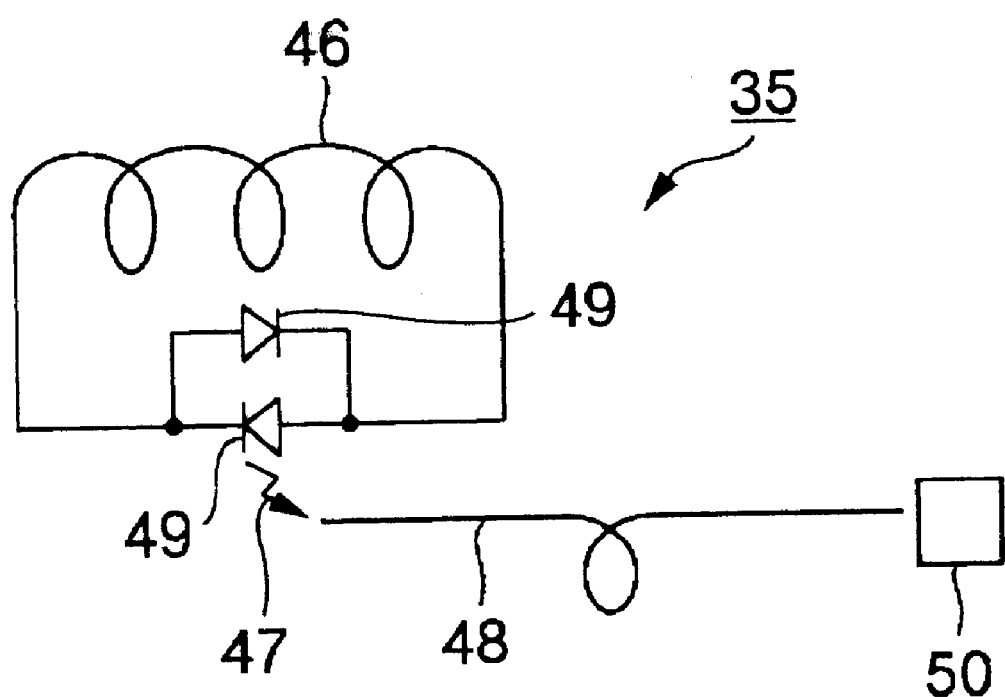
FIG. 2 is a circuit diagram of a discharge detector according to the embodiment.

The oscillator 11A and the amplifier 11B include an oscillator discharge detector 35A and an amplification discharge detector 35B for detecting that oscillator discharge and amplification discharge are carried out. The discharge detectors 35A and 35B (a discharge detector 35) include a coil 46 and a light emitting diodes 49 and 49 for connecting both poles thereof, as shown in, for example, FIG. 2. When discharge occurs, an electric current flows through the coil 46 due to electromagnetic wave noise occurring from the discharge, and the light emitting diodes 49 and 49 emit. Emission 47 of the light emitting diodes 49 and 49 is guided to a light detector 50 by an optical fiber 48, and discharge is detected by an electric signal outputted from the light detector 50. Since the light emitting diode 49 is used as above, the electromagnetic wave noise of the discharge is electrically shut off, and the discharge detector 35 seldom operates in a wrong way, which makes it possible to surely detect discharge.

As described above, the fluorine molecular laser device 11 includes the compensation circuit 31 for synchronizing the seed laser light 21A emitted from the oscillator 11A and the amplified discharge, with the trigger signal GL as reference. The compensation circuit 31 includes jitter compensation circuits 39A and 39B for controlling an elapsed time from the trigger signal GL to the start of discharge from varying in a short term according to the variation in the oscillator voltage VA.

Further, in preparation for the characteristics of the discharge circuits 43A and 43B varying according to a long-term temperature change and the like, the compensation circuit 31 includes drift compensation circuits 40A and 40B for matching compensation coefficients of the jitter compensation circuits 39A and 39B with this change in the characteristics. Further, the compensation circuit 31 includes a delay time compensation circuit 41 for matching a delay time, which is from the light emission of the seed laser light 21A from the oscillator 11A to the start of the amplified discharge to a predetermined optimal delay time.

Figure 3:
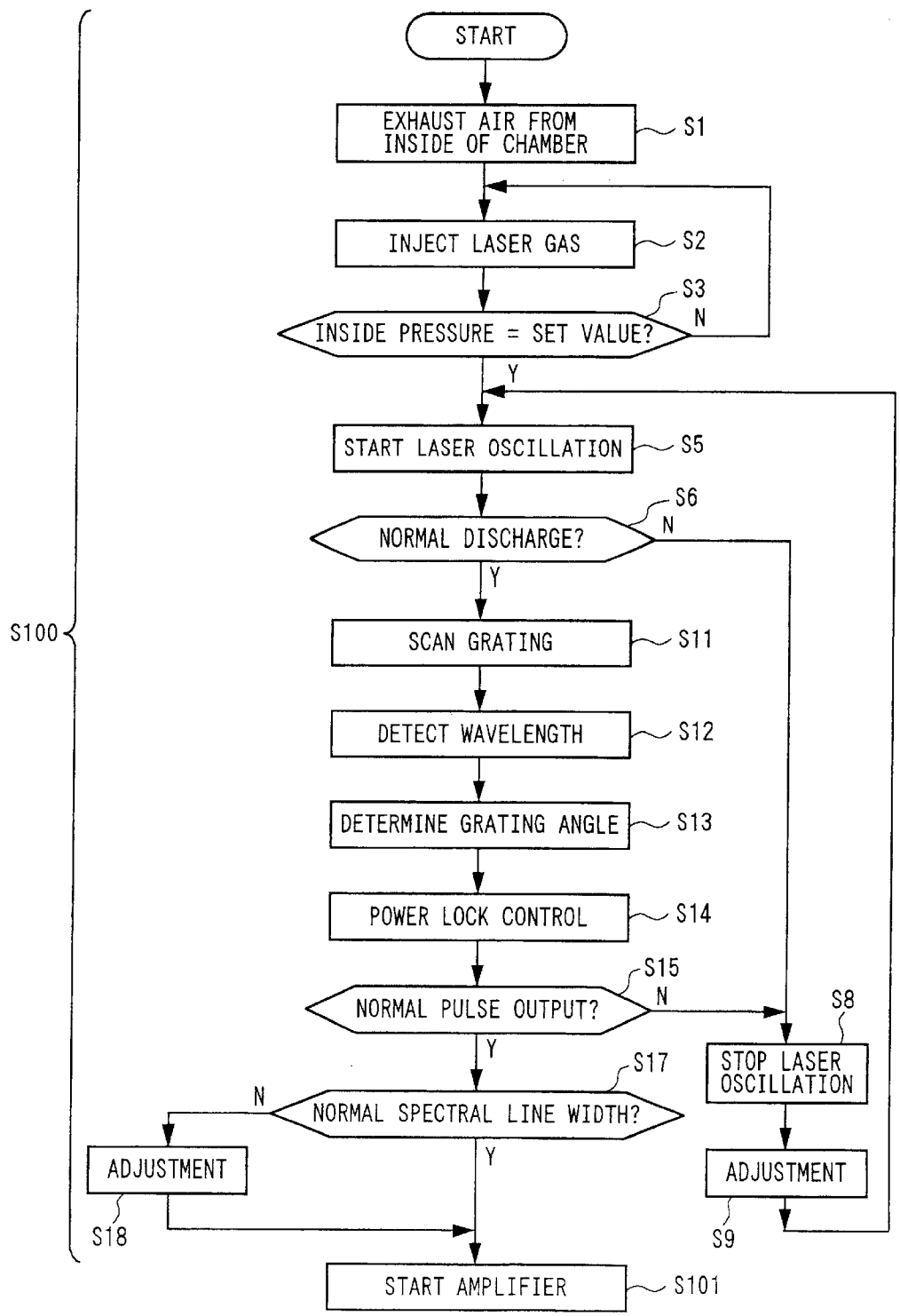
FIG. 3 is a flowchart showing a startup procedure of an oscillator in the embodiment.

A procedure at the time of starting the above fluorine molecular laser device 11 will be explained hereinafter. FIG. 3 shows the procedure of adjustment oscillation, which is performed when the oscillator 11A is started. In this situation, the shutters 52A and 52B are in a closed state.

First, the laser controller 29 exhausts air from the inside of the oscillator chamber 12A by a vacuum pump (not shown) connected to the oscillator chamber 12A (step S1). Then, laser gas is injected into the oscillator chamber 12A from the laser gas cylinder 51A (step S2). At this time, inside pressure is detected by the pressure detector 38A and when predetermined pressure is detected, injection is stopped (step S3).

The laser controller 29 always monitors the pressure inside the oscillator chamber 12A based on an output value of the pressure detector 38A after the laser gas injection. When the pressure goes out of a normal range from the predetermined value, the laser controller 29 determines that something abnormal occurs, and outputs an abnormal signal to the aligner 25 to stop laser oscillation. Instead of using only one laser gas cylinder 51A, it may be suitable to seal fluorine diluted with a buffer gas and a buffer gas in different cylinders, inject each gas at predetermined pressure to make gas inside the oscillator chamber 12A at predetermined pressure and predetermined composition ratio.

Next, the laser controller 29 outputs a command to the oscillator charger 42A to cause the oscillator 11A to perform laser oscillation at a predetermined oscillator voltage VA and frequency (step S5). The trigger signal GL at this time is outputted from the laser controller 29 irrespective of the trigger signal G. After the laser oscillation, the laser controller 29 determines whether the discharge is normally carried out at an instructed frequency based on an output signal of the discharge detector 35A (step S6).

When discharge is not normal, the laser controller 29 stops the laser oscillation (step S8), performs predetermined adjustment for the oscillator 11A (step S9), and returns to step S5. The predetermined adjustment in step S9 includes, for example, alignment adjustment for the optical components, replacement of the laser gas as means for avoiding abnormal discharge, and the like.

In step S6, when the discharge is normal, the laser controller 29 outputs a signal to the drive mechanism inside the band-narrowing unit 30, and scans the angle of the grating 33 to the seed laser light 21A in a control range (step S11). The laser controller 29 monitors the wavelength characteristics of the wavelength monitor 34A during the scanning (step S12), and controls the angle of the grating 33 so that the center wavelength λc of the seed laser light 21A becomes a target value (step S13).

When the center wavelength λc becomes the target value, the laser controller 29 changes the oscillator voltage VA to start the aforementioned power lock (step S14). Then, it determines the pulse output of the seed laser light 21A (step S15), and unless the pulse output is a desired output value, it proceeds to step S8 to stop the laser oscillation. If the pulse output becomes the desired output value, it detects the spectral line width Δλ (step S17).

When the spectral line width Δλ is out of a desired allowable range in step S17, the entire pressure of the laser gas inside the oscillator chamber 12A is adjusted, whereby the spectral line width Δλ is returned into the allowable range (step S18). Alternatively, instead of adjusting the entire pressure, it may be suitable to adjust the oscillator voltage VA, partial pressure of fluorine of the laser gas inside the oscillator chamber 12A and the like. The same thing can be said about the following steps, and in this explanation, the case in which the entire pressure is adjusted will be described.

Specifically, when the spectral line width Δλ is excessively wide, the resolution of the exposure reduces, and therefore in order to prevent this, the entire pressure inside the oscillator chamber 12A is reduced and the spectral line width Δλ is narrowed. Meanwhile, the narrower the spectral line width Δλ is, the more preferable it becomes for exposure. However, it is not necessary to make it narrower than an allowable range, and when it is narrower than the allowable range, the entire pressure inside the oscillator chamber 12A is increased. As a result, the spectral line width Δλ is widened a little, and the pulse output is increased. Accordingly, the oscillator voltage VA for obtaining predetermined pulse output during a power lock control is decreased, which makes it difficult to deteriorate the laser gas and the life of the gas is increased.

In step S17, if the spectral line width Δλ is within a desired range, adjustment oscillation flow at the time of the startup of the oscillator 11A (step S100) is finished, and a command is given to proceed to adjustment oscillation flow at the time of the startup of the amplifier that will be described later (step S101).

Figure 4:
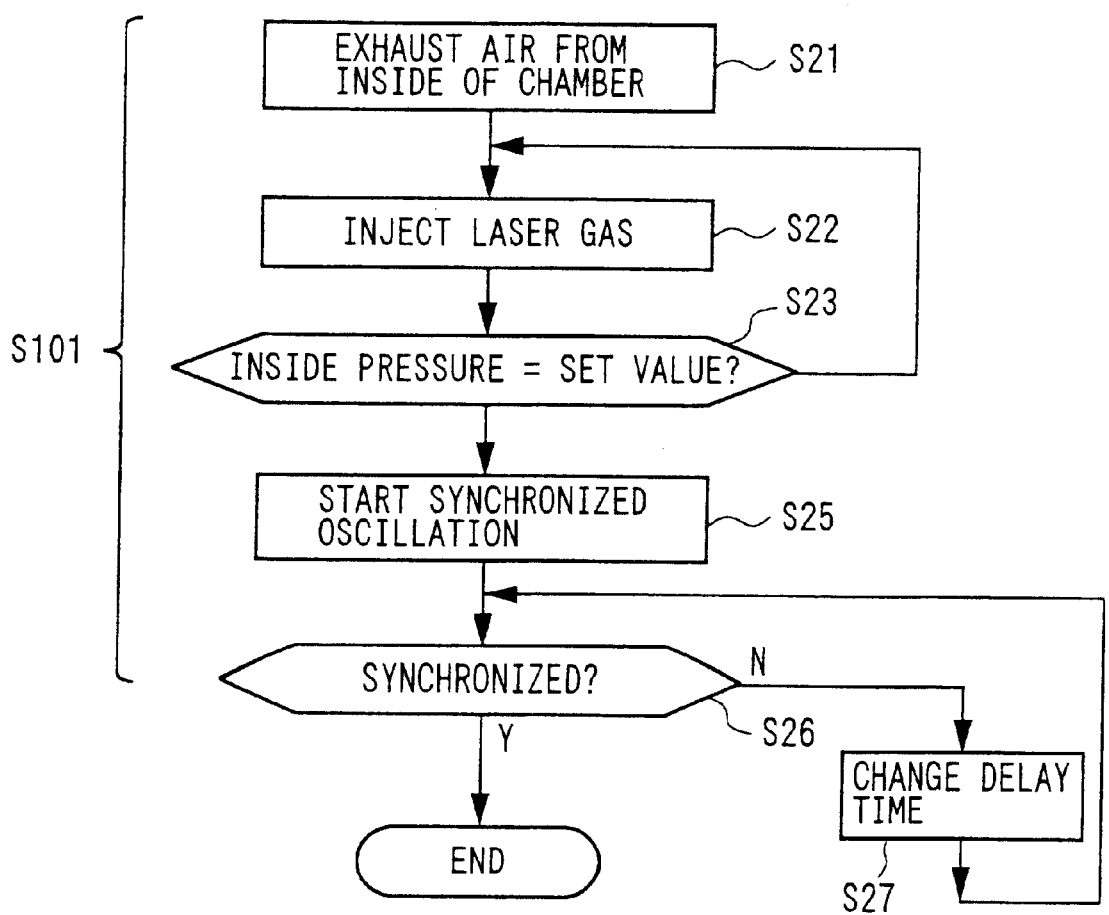
FIG. 4 is a flowchart showing a startup procedure of an amplifier in the embodiment.

Next, the adjustment oscillation flow at the time of the startup of the amplifier 11B (step S101) will be explained. In FIG. 4, an adjustment oscillation procedure at the time of the startup in the amplifier 11B is shown in the flowchart.

First, the laser controller 29 exhausts air from the inside of the amplifier chamber 12B by a vacuum pump (not shown) connected to the amplifier chamber 12B (step S21). Then, laser gas is injected into the amplifier chamber 12B from the laser gas cylinder 51B (step S22). At this time, the pressure inside the amplifier chamber 12B is detected by the pressure detector 38B and when predetermined pressure is detected, the injection is stopped (step S23). The above-described steps S21 to S23 are simultaneously proceeded when steps S1 to S3 are performed, whereby start-up time can be shortened.

The laser controller 29 always monitors the pressure inside the amplifier chamber 12B based on an output value of the pressure detector 38B after the laser gas injection. When the pressure goes out of a normal range from the predetermined value, the laser controller 29 determines that something abnormal occurs, and outputs an abnormal signal to the aligner 25 to stop the laser oscillation. Instead of using only one laser gas cylinder 51B, it may be suitable to seal, for example, fluorine diluted with the buffer gas and the buffer gas in different cylinders, inject each gas at predetermined pressure to make gas inside the amplifier chamber 12B at predetermined pressure and a predetermined composition ratio.

Next, the laser controller 29 oscillates the seed laser light 21A while carrying out a power lock control as shown in step S14. In this situation, the shutter 52A is in an open state, and the shutter 52B is in a closed state. At the same time, the laser controller 29 outputs a command to the amplifier charger 42B to cause amplification discharge at a predetermined amplifier voltage VB and frequency in synchronization with the oscillation of the seed laser light 21A (step S25). This is called synchronous oscillation.

Subsequently, the laser controller 29 determines whether the amplified laser light 21B is emitted in synchronization with the seed laser light 21A or not based on the output value of the wavelength monitor 34B (step S26). The determination of step S26 is carried out by confirming whether the amplified laser light 21B satisfies both of the following two conditions or not.

(1) The pulse output of the amplified laser light 21B is a predetermined value or more.

(2) The spectral line width Δλ of the amplified laser light 21B is within a predetermined range.

If either of these two conditions is not satisfied, it is determined that the amplified laser light 21B is not synchronized with the oscillation of the seed laser light 21A. The laser controller 29 then outputs a command to the delay circuit 44 to change delay time and controls an output timing of the amplifier trigger signal G2 (step S27). This is carried out until the amplified laser light 21B satisfies both of the above-described conditions.

In step S26, when it is determined that the amplified laser light 21B is emitted in synchronization with the seed laser light 21A, the synchronous oscillation is finished and the shutter 52B is brought into an open state to finish the adjustment oscillation flow at the time of startup in the amplifier. Then, the aligner 25 is informed of the completion of the startup of the fluorine molecular laser device 11, and the oscillation is started based on the trigger signal G outputted form the aligner 25. Regarding the above-described two conditions, the spectral line width Δλ of the amplified laser light 21B in the condition (2) is definitely out of the predetermined range when the amplified discharge is not synchronized, and therefore the determination may be made based on only the condition (2).

Next, adjustment oscillation during the suspension will be explained.

As described in the paragraphs of the prior art, the center wavelength λc is deviated due to temperature change inside the band-narrowing unit 30 at the time of resuming of oscillation after the fluorine molecular laser device 11 is rested during exposure. In order to prevent this, in the present embodiment, when oscillation is rested for a predetermined period of time or more, adjustment oscillation is performed with the similar procedure to the start-up time, so that the oscillator 11A and the amplifier 11B are favorably oscillated.

Figure 5:
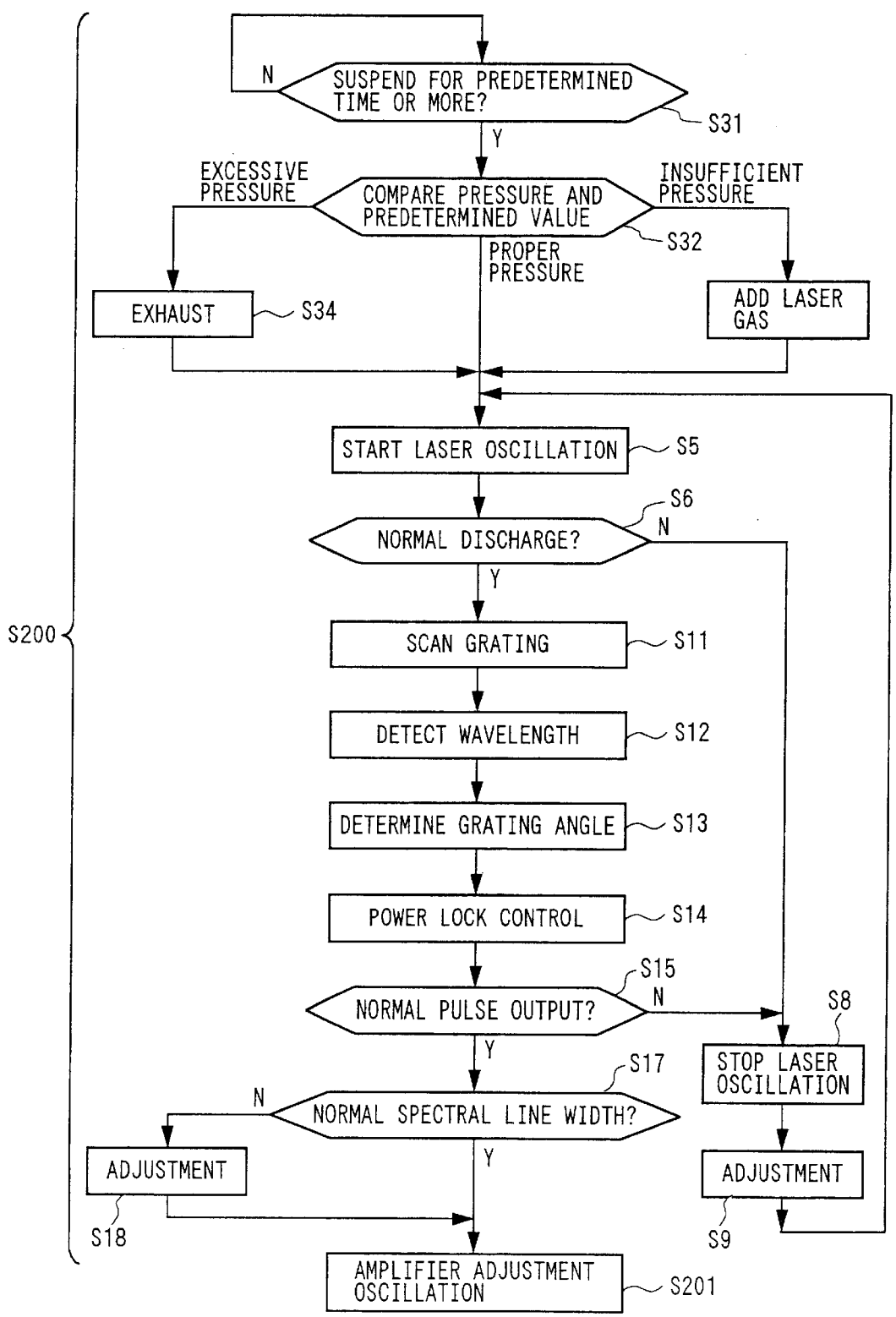
FIG. 5 is a flowchart showing a procedure of adjustment oscillation of the oscillator in the embodiment.

FIG. 5 shows a flowchart of the procedure of the adjustment oscillation in the oscillator 11A. In this situation, the shutters 52A and 52B are both in a closed state. First, the laser controller 29 determines whether or not the resting time of the laser oscillation is not less than a predetermined period of time, and if it is not less than the predetermined period of time, it starts adjustment oscillation (step S31). The laser controller 29 then detects the pressure inside the oscillator chamber 12A (step S32), and if the pressure is insufficient, it adds the laser gas (step S33), and if the pressure is excessive, it exhausts the laser gas by means of a vacuum pump not shown (step S34).

Subsequently, laser oscillation is started under the predetermined conditions (step S5). The procedure after this is the same as steps S5 to S20 shown in FIG. 3, and therefore the explanation will be omitted. This concludes the adjustment oscillation procedure of the oscillator 11A (step S200) and a command is given to proceed to the adjustment oscillation procedure of the amplifier 11B (step S201).

Figure 6:
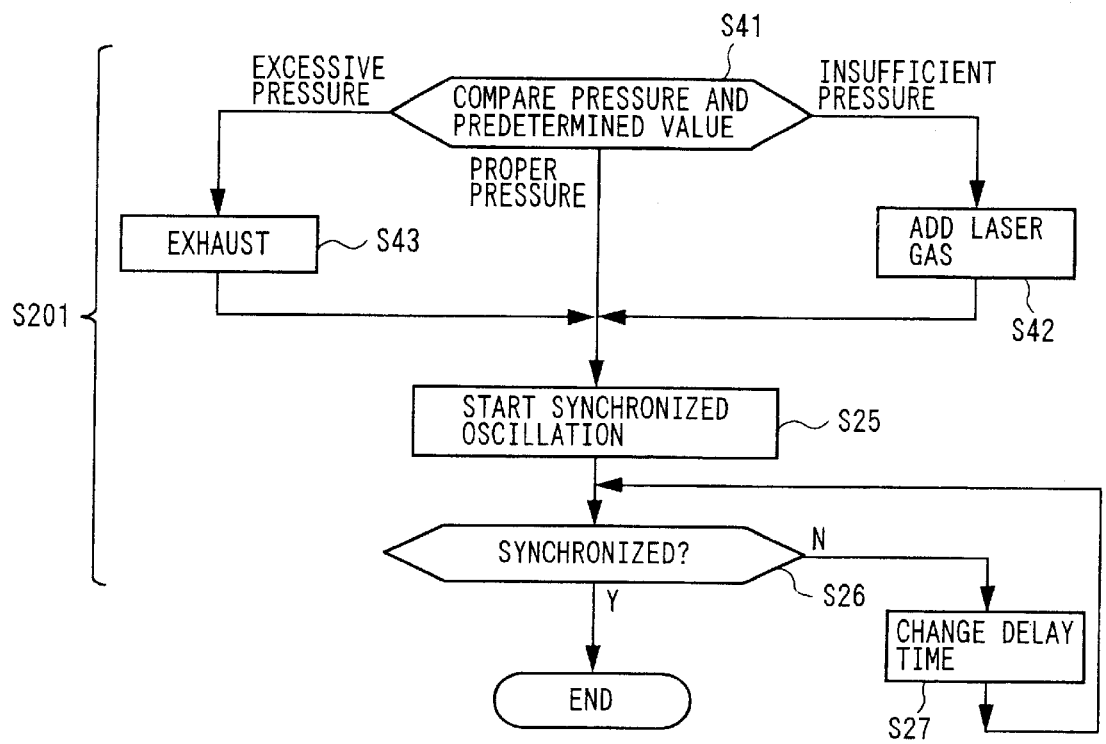
FIG. 6 is a flowchart showing a procedure of adjustment oscillation of the amplifier in the embodiment.

FIG. 6 shows a flowchart of the adjustment oscillation procedure (step S201) of the amplifier 11B. The laser controller 29 detects the pressure inside the amplifier chamber 12B (step S41). If the pressure is insufficient, it adds the laser gas (step S42) and if the pressure is excessive, the laser gas is exhausted by means of a vacuum pump not shown (step S43).

Subsequently, while performing a power lock control as shown in step S14 in FIG. 5, the laser controller 29 oscillates the seed laser light 21A. In this situation, the shutter 52A is in an open state, and the shutter 52B is in a closed state. At the same time, a command is outputted to the amplifier charger 42B to cause amplification discharge at a predetermined amplifier voltage VB and frequency in synchronization with the oscillation of the seed laser light 21A (step S25). The procedure after this is the same as the steps S23 to S27 shown in FIG. 4, and therefore the explanation will be omitted. This concludes the adjustment oscillation procedure of the amplifier 11B (step S201).

During this adjustment oscillation, the laser controller 29 monitors the laser parameters of the oscillator 11A and the amplifier 11B, respectively, and continues the power lock control and wavelength control so that these parameters are within allowable ranges. It also performs compensation of jitter and drift during adjustment oscillation. As a result, when the operation of the fluorine molecular laser device 11 is restarted, the amplified laser light 21B with the laser parameters being within the allowable range can be obtained, and exposure can be promptly restarted.

As explained thus far, according to the present embodiment, adjustment oscillation is performed for the oscillator 11A in the injection locking type of fluorine molecular laser device 11 at the time of suspending the oscillation for a predetermined period of time or more. And the wavelength control is performed during adjustment oscillation so that the center wavelength $\lambda c$ of the seed laser light 21A is close to a target value. The above-described time of suspending the oscillation for a predetermined period of time or more includes a start-up time, the time of suspending laser oscillation according to a command from the aligner 25 and the like, and the case in which the laser oscillation is suspended due to the other reasons is similarly included.

As a result, when the oscillation is restarted after the suspension, the center wavelength $\lambda c$ of the seed laser light 21A is close to the target value, and therefore the center wavelength $\lambda c$ of the amplified laser light 21B can be controlled to be a target value in a short time by a wavelength control after the restart of the oscillation. Specifically, time taken before exposure is performed with favorable wavelength characteristics for exposure is shortened and availability of the aligner 25 is improved. As a result of the above, the amplified laser light 21B with its wavelength out of the target value is hardly emitted, thus decreasing the exposure error of the aligner 25.

According to the present embodiment, synchronous oscillation of the amplifier 11B is performed in correspondence with the seed laser light 21A at the time of adjustment oscillation and delay time is adjusted so that the synchronization is favorably carried out. As a result, when oscillation is restarted after suspension, the amplifier 11B immediately oscillates in synchronization with the seed laser light 21A, and therefore the amplified laser light 21B with desired wavelength and pulse output can be obtained.

Synchronization/loss of synchronization is determined based on whether the spectral line width $\Delta\lambda$ of the amplified laser light 21B is within a predetermined range or not. As a result of the above, synchronization/loss of synchronization can be surely determined. Further, in addition to this, if it is determined according to the pulse output of the amplified laser light 21B, more reliable determination can be made.

Figure 7:
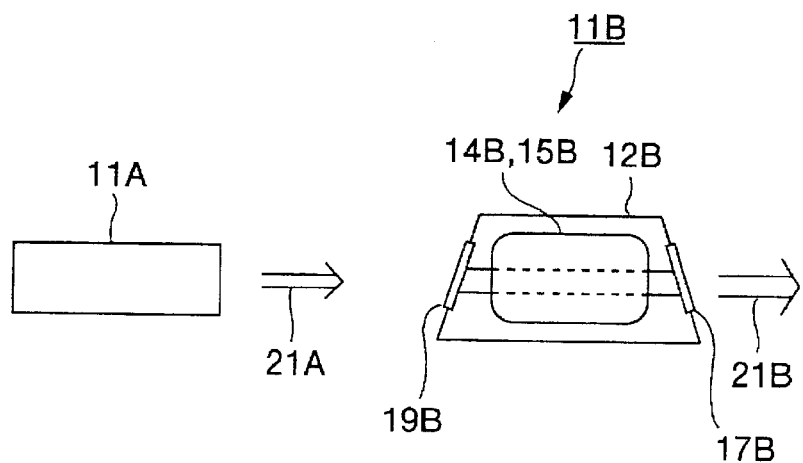
FIG. 7 is an explanatory view showing an application example of a structure of the fluorine molecular laser device according to the embodiment of the present invention.
Figure 8:
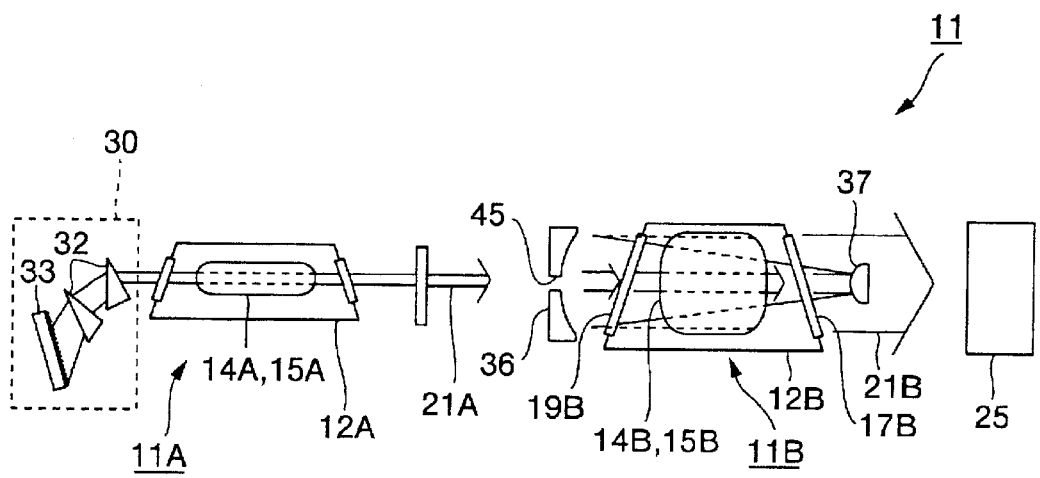
FIG. 8 is a block diagram of a laser device according to a prior art.

As the explanation of the present invention, the amplifier 11B with the concave mirror 36 with a hole and the convex mirror 37 being placed before and after the amplifier chamber 12B is explained, but this is not restrictive. For example, as shown in FIG. 7, the present invention is also effective for the MOPA type of amplifier 11B without a resonator before and after the amplifier chamber 12B.

Further, the explanation that the trigger signal G is sent from the aligner 25 during exposure is made, but this not restrictive. For example, the trigger signal G may be always outputted from the laser controller 29, or it may be outputted from another device. Further, the present invention is not limited to the fluorine molecular laser devices, but it is applicable to all the injection locking type or MOPA type of laser devices such as excimer laser devices.

In the above-described explanation, it is described that the grating 33 is rotated on the occasion of the wavelength control, but this is not restrictive, and for example, the prism 32 may be rotated. Alternatively, a mirror not shown may be provided inside the band-narrowing unit 30 and this mirror may be rotated.

Further, as the structure of the band-narrowing unit 30, instead of band-narrowing the wavelength by the grating 33, etalon may be used. Specifically, instead of the prisms 32 and 32 and the grating 33, a total reflection mirror is placed on an optical axis of the seed laser light 21A behind the oscillator chamber 12A so as to oppose the partial reflection mirror 16 with the oscillator chamber 12A between them. The etalon is placed between the oscillator chamber 12A and either the total reflection mirror or the partial reflection mirror 16. An incident angle of the seed laser light 21A on the etalon, or pressure of a gas between the substrates of the etalon may be controlled, and thereby the wavelength control may be performed. Alternatively, etalon may be placed instead of the partial reflection mirror 16, and the pressure of the gas between the substrates may be controlled.

The aligner 25 explained in each of the above-described embodiment is not limited to the aligner for semiconductor lithography, but it may be any processing equipment utilizing the change of the state of an object to be worked by irradiation of laser light, such as an annealing device and etching device.

What is claimed is:

1. An injection locking type or MOPA type of laser device (11) used with a processing device (25), the injection locking type or MOPA type of laser device (11) and the processing device (25) being electrically connected with each other and mutually communicable, comprising:

a laser controller (29) for outputting a laser trigger signal (GL) when receiving a trigger signal (G), which is a sign of laser oscillation, from the processing device (25);

an oscillator (11A) for exciting a laser gas by oscillator discharge caused by application of an oscillator voltage (VA) across oscillator electrodes (14A, 15A), which are disposed in an oscillator chamber (12A) where the laser gas is sealed, from an oscillator discharge circuit (43A), the oscillator exciting the laser gas in response to an input of the laser trigger signal (GL) to generate a seed laser light (21A), and oscillating the seed laser light (21A) with a wavelength band being narrowed by a band-narrowing unit (30) including a grating (33);

an amplifier (11B) for amplifying the seed laser light (21A) by amplification discharge caused by application of an amplifier voltage (VB) across amplifier electrodes (14B, 15B), which are disposed in an amplifier chamber (12B) where the laser gas is sealed, by means of an amplification discharge circuit (43B) in response to an input of the laser trigger signal (GL) to emit an amplified laser light (21B) to the processing device (25); and a first wavelength monitor (34A) disposed between the oscillator (11A) and the amplifier (11B) for detecting a center wavelength ($\lambda c$) of the seed laser light (21A), wherein the laser controller (29) adjusts an angle of the seed laser light (21A) incident to the grating (33) on the basis of the center wavelength (λc) of the seed laser light (21A) detected by the first wavelength monitor (34A) to accommodate the center wavelength (λc) of the seed laser light (21A) within an allowable range.

2. The laser device according to claim 1, further comprising:

a delay circuit (44) for setting a delay timer (ΔT) from light emission of the seed laser light (21A) to a start of the amplification discharge, wherein the laser controller (29) changes the delay time (ΔT) by outputting a command to the delay circuit (44) to synchronize the amplification discharge with the seed laser light (21A).

3. The laser device according to claim 2, further comprising:

a first jitter compensation circuit (39A) for controlling a time required from an output time of the laser trigger signal (GL) to the start of the oscillator discharge from varying;

a second jitter compensation circuit (39B) for controlling a time required from the output time of the laser trigger signal (GL) to the start of the amplification discharge from varying;

a first drift compensation circuit (40A) for matching a compensation factor of the first jitter compensation circuit (39A) to a change in the characteristic of the oscillator discharge circuit (43A);

a second drift compensation circuit (40B) for matching a compensation factor of the second jitter compensation circuit (39B) to a change in the characteristic of the amplification discharge circuit (43B); and a delay time compensation circuit (41) for compensating the delay time (ΔT) set by the delay time circuit (44) by means of the first jitter compensation circuit (39A), the second jitter compensation circuit (39B), the first drift compensation circuit (40A) and the second drift compensation circuit (40B), wherein the laser controller (29) compensates the delay time (ΔT) by the delay time compensation circuit (41) to synchronize the amplification discharge with the seed laser light (21A).

4. An injection locking type or MOPA type of laser device (11) used with a processing device (25), the injection locking type or MOPA type of laser device (11) and the processing device (25) being electrically connected with each other and mutually communicable, comprising:

a shutter (52B) provided between the laser device (11) and the processing device (25), for shuttering incidence, of laser light emitted from the laser device (11) to the processing device (25);

an oscillator (11A) for exciting a laser gas by oscillator discharge caused by application of an oscillator voltage (VA) across oscillator electrodes (14A, 15A), which are disposed in an oscillator chamber (12A) where the laser gas is sealed, from an oscillator discharge circuit (43A), the oscillator exciting the laser gas in response to an input of the laser trigger signal (GL) to generate a seed laser light (21A), and oscillating the seed laser light (21A) with a wavelength band being narrowed by a band-narrowing unit (30) including a grating (33);

an amplifier (11B) for amplifying the seed laser light (21A) by amplification discharge caused by application of an amplifier voltage (VB) across amplifier electrodes (14B, 15B), which are disposed in an amplifier chamber (12B) where the laser gas is sealed by means of an amplification discharge circuit (43B) in response to an input of the laser trigger signal (GL) to emit an amplified laser light (21B) to the processing device (25); and a first wavelength monitor (34A) disposed between the oscillator (11A) and the amplifier (11B) for detecting a center wavelength (λc) of the seed laser light (21A), wherein a laser controller (29), wherein receiving a trigger signal (G) which is a sign of laser oscillation, from the processing device (25), controls to make the shutter (52B) to be in a non-shuttering state to output the laser trigger signal (GL) and, on the basis of the center wavelength (λC) of the seed laser light (21A detected by the first wavelength monitor (34A), controls to accommodate the center wavelength (λC) of the seed laser light (21A) within an allowable range and controls the laser light emitted from the laser device (11) to incident to the processing device (25) and, when the laser oscillation in the laser device (11) stops for more than a predetermined time, controls the shutter (52B) to be in a shuttering state to output the laser trigger signal (GL) irrespective of a trigger signal (G) output from the processing device (25) and makes the oscillator (11A) to perform adjustment oscillation of the seed laser light (21A), and, based on the center wavelength (λc) of the seed laser light (21A) detected by the first wavelength monitor (34A), adjusts an angle of the seed laser light (21A) incident to the grating (33) to accommodate the center wavelength (λc) of the seed laser light (21A) within an allowable range.

5. The laser device according to claim 4, further comprising:

an other one shutter (52A) disposed between the oscillator (11A) and the amplifier (11B), for shuttering incidence of the seed laser light (21A) to the amplifier (11B) by opening operation;

wherein the laser controller (29) controls the operation of the other one shutter (52A) and the shutter (52B) at the time of the adjustment oscillation of the seed laser light (21A) by the oscillator (11A).

6. The laser device according to claim 4, further comprising:

a second wavelength monitor (34B) disposed at an emittance side of the amplifier (11B), for detecting a spectral line width (Δλ) of the amplified laser light (21B), wherein the laser controller (29) controls to make the oscillator (11A) to perform the adjustment oscillation of the seed laser light (21A), controls to make the amplifier (11B) to perform the amplification discharge and, based on the spectral line width (Δλ) of the amplified laser light (21B) detected by the second wavelength monitor (34B), judges whether or not the emitted laser light (21B) is in synchronization with the seed laser light (21A) and controls the emitted laser light (21B) to oscillate in synchronization with the seed laser light (21A).

7. The laser device according to claim 4, further comprising:

a delay circuit (44) for setting a delay time (ΔT) from light emission of the seed laser light (21A) to a start of the amplification discharge, wherein the laser controller (29) outputs a command to the delay circuit (44) to change the delay time (ΔT) so as to synchronize the amplification discharge with the seed laser light (21A).

8. The laser device according to claim 4, wherein the laser oscillation in the laser device (11) stops for more than a predetermined time when the laser device (11) starts up or when the oscillation of the seed laser light (21A) stops for more than a predetermined time.

* * * * *